(12) United States Patent
Togami et al.

(10) Patent No.: US 8,446,642 B2
(45) Date of Patent: May 21, 2013

(54) IMAGE PROCESSING APPARATUS

(75) Inventors: Atsushi Togami, Kanagawa (JP);
Tomoyuki Yoshida, Tokyo (JP); Toshiya Hikita, Tokyo (JP); Takeharu Tone, Kanagawa (JP); Shuji Kimura, Kanagawa (JP); Takumi Nozawa, Kanagawa (JP); Toshimi Yamamura, Kanagawa (JP); Akira Murakata, Tokyo (JP); Satoshi Ohkawa, Tokyo (JP); Manabu Komatsu, Tokyo (JP); Yasunobu Shirata, Tokyo (JP); Hiroyuki Kawamoto, Kanagawa (JP); Yukihiko Tamura, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 1247 days.

(21) Appl. No.: 11/890,640

(22) Filed: Aug. 7, 2007

(65) Prior Publication Data

US 2008/0037036 A1 Feb. 14, 2008

(30) Foreign Application Priority Data

Aug. 11, 2006 (JP) .................................. 2006-220144

(51) Int. Cl.
*G06K 9/00* (2006.01)
*H04N 1/04* (2006.01)

(52) U.S. Cl.
USPC .............. 358/448; 358/1.1; 358/1.6; 358/1.9; 358/2.1; 382/167; 382/307

(58) Field of Classification Search
USPC ................. 358/1.11–1.18, 1.9, 1.1, 518–521, 358/296, 442–448, 462, 1.2; 382/295, 83, 382/162, 167, 299, 307
See application file for complete search history.

(56) References Cited

U.S. PATENT DOCUMENTS 7,164,486 B1 * 1/2007 Nakamura et al. ........... 358/1.15
7,376,268 B2 * 5/2008 Shirata et al. ................. 382/167

(Continued)

FOREIGN PATENT DOCUMENTS

JP 2001223828 A * 8/2001
JP 2002-111988 4/2002

(Continued)

OTHER PUBLICATIONS

Nov. 30, 2010 Japanese official action in connection with a counterpart Japanese patent application.

(Continued)

*Primary Examiner* — Twyler Haskins
*Assistant Examiner* — Chad Dickerson
(74) *Attorney, Agent, or Firm* — Cooper & Dunham LLP

(57) ABSTRACT

An image processing apparatus in which the reusability of digital image data is improved is disclosed. The apparatus includes an image reading unit reading a draft and obtaining the digitized image data; an image writing unit printing image data on a transfer paper; a recording unit recording image data and attached information of the image data; an external I/F unit transmitting and receiving image data and attached information of the image data; a first and a second image data processing units processing the image data from the image reading unit and the recording unit, respectively; and a bus controlling unit connecting each of the units. The first and the second image data processing units match the characteristics of the image data to prescribed characteristics so that the matched image data can be usable for both the image writing unit and the external device.

16 Claims, 7 Drawing Sheets

U.S. PATENT DOCUMENTS

| | | | |
|---|---|---|---|
| 7,664,320 B2 * | 2/2010 | Yoshida et al. | 382/167 |
| 2005/0036173 A1 * | 2/2005 | Hayashi et al. | 358/2.1 |
| 2005/0219594 A1 * | 10/2005 | Miyamoto et al. | 358/1.13 |

FOREIGN PATENT DOCUMENTS

| | | |
|---|---|---|
| JP | 2002-320079 | 10/2002 |
| JP | 2003-224716 | 8/2003 |
| JP | 2004-80627 | 3/2004 |
| JP | 2004080627 A * | 3/2004 |
| JP | 3647347 | 2/2005 |

OTHER PUBLICATIONS

Feb. 22, 2011 Japanese official action in connection with a counterpart Japanese patent application.

* cited by examiner

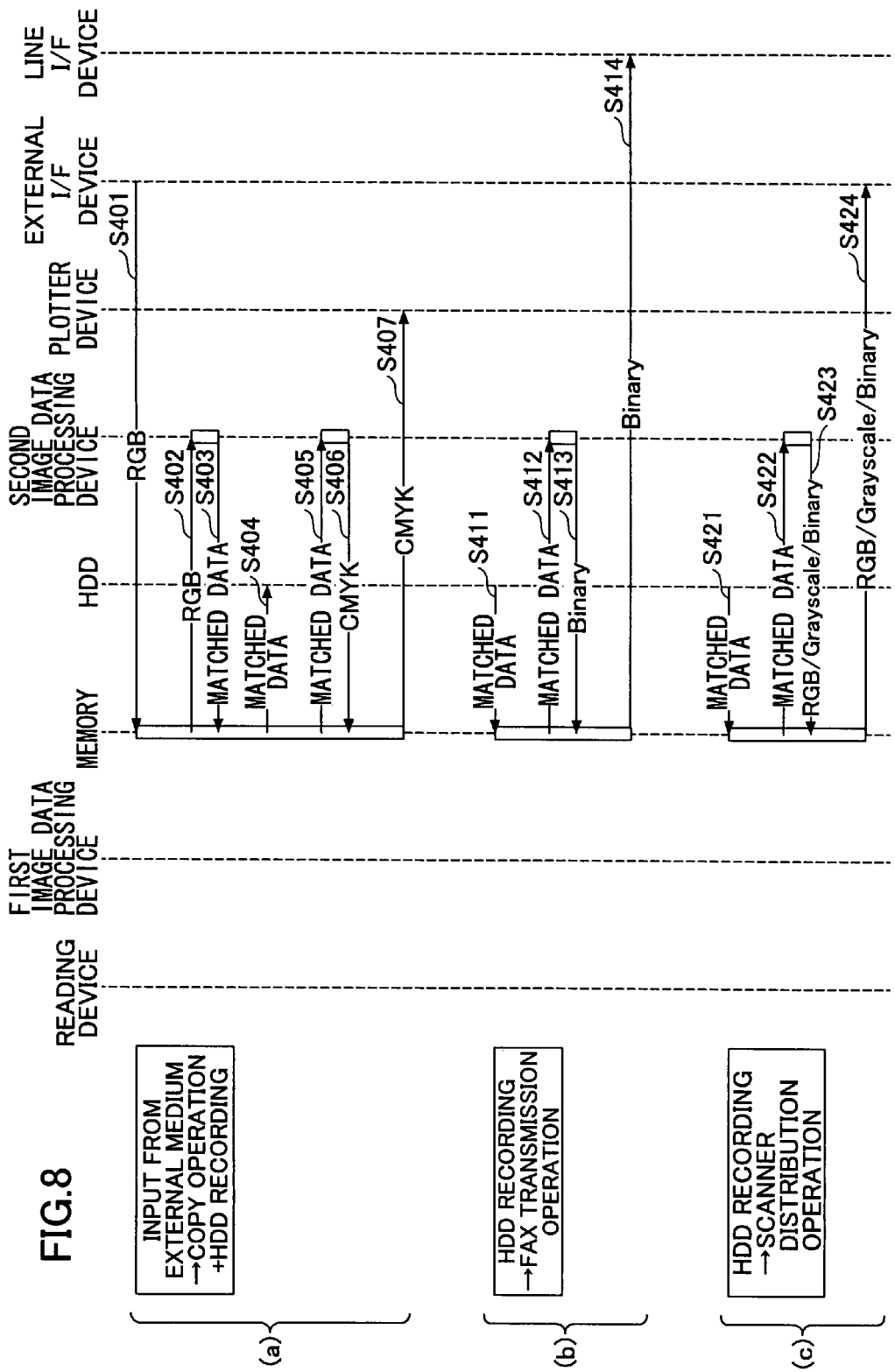

IMAGE PROCESSING APPARATUS

BACKGROUND

1. Technical Field

This disclosure generally relates to an image processing apparatus such as a Multi Function Printer (MFP) combining, for example, a copy machine, a facsimile machine, a printer, and a scanner.

2. Description of the Related Art

With the developments of reading apparatuses using a line sensor made of a CCD photoelectric conversion device and toner writing devices using laser irradiation, digital copying machines capable of copying from digitized image data have appeared to end the era of analog copying machines.

Since appearing, digital copying machines continue to be developed as the compatibility with other apparatuses has been improved. Not only the copy function but other functions such as the facsimile function, printing function, and scanning function are combined in the digital copying machine. As a result of the development, the digital copying has been called a Multi Function Printer (MFP).

With the increase in the capacity and the decrease in the cost of storage devices such as a HDD, the increase in speed and use of communication technologies such as a network, the increase in performance of CPUs, and the development of technologies concerning the MFP such as a technology of digital image data (compression technology), the number of functions included in MFPs has increased and a greater variety of functions has been included in MFPs.

MFPs have begun to be used in different and various ways. For example, there are small-sized MFPs located next to a personal computer (PC) as a pair and an operator can easily use any of the facsimile, printer, and scanner functions of the MFP. Further, there are middle-sized MFPs shared by plural persons in a division or section, meeting certain productivity targets and having functions such as sorting, punching, and stapling. Further, there are large-sized MFPs providing high productivity and high quality and many functions, or used in a specialized division providing centralized copy services for the entire company, or used in a company engaged in copying and relevant businesses.

Though MFPs have been diversified from small-sized to large-sized, while some functions are commonly used among those classes, some other functions may be strongly requested for a specific class of MFPs. For example, generally, post processing functions performed on paper after a plotting process such as punching, stapling, and folding, and digital filing process are in demand for a large-sized MFP. Enhancing functions of, for example, Internet FAX and PC-FAX and high quality image printing using dedicated paper for personal use are in demand for small-sized MFPs.

To meet such different and diversified user demands for MFPs, systems dedicated to each of the classes have been conventionally provided and sold.

However, the importance of information value in business fields has been already acknowledged, and information is required to be transmitted not only faster, more accurately and securely but also more plainly and effectively. With the increase in speed and use of communication technologies, the increase in capacity and the decrease in cost and size of storage devices, and the increase in performance of PCs, new technologies capable of handing digital data effectively have appeared. Accordingly, new functions are desired to be added to or integrated into MFPs capable of handling digital image data, one of the digital data forms.

Patent Document 1: Japanese Patent Application Publication No: 2002-111988
Patent Document 2: Japanese Patent Application Publication No: 2003-224716

As a result of the increase in capacity and the decrease in cost of storage devices and the integration and development of the MFP's functions of generating digital image data from a paper draft, the number of operations of recording and storing digital image data in the MFP and of re-outputting the data when necessary, has increased lately.

However, there arises a problem in that the re-output data may not meet the exact requirements when the data are re-output. This is because, in many cases, a long period of time has passed since the data were originally recorded and stored and thus the status of the operator who re-outputs the data, or the requirements have been changed. As a result, it may be difficult to meet the latest requirements when data are re-output from a conventional MFP when the data were recorded long ago.

For example, it may not be possible to perform fax transmission of the data that have been stored in an MFP using the copy function of the MFP. Even if possible, there may still be problems, for example, the image quality may be greatly changed and the productivity may be greatly lowered.

Further, in a case where image data have been recorded in a MFP by reducing the size from two pieces of A4-sized draft data into one piece of A4-sized data using a copy functions and then the stored two pieces of A4-sized draft data are desired to be plotted out on two pieces of A4-sized transfer paper, it may not be possible. Even if possible, there may still be problems, for example, the image quality is greatly changed and the productivity is greatly lowered.

According to the Patent Document 1, there is provided a second image processing unit performing image processing on recorded and stored image data. However, the object of the second image processing unit is to increase the processing speed but there is no description of any method of reusing the stored image data.

Further, according to the Patent Document 2, in a case where recorded and stored image data are to be output from another apparatus, the image data are corrected based on the predetermined characteristics when the data are output to the apparatus. However, in this configuration, the correction is performed after the data are stored, thus there is a problem that the efficiency (throughput) is not very good when the stored image data are being input and output. Further, since the object of the configuration is to reduce the variations due to the differences among apparatuses, there is still a problem when a request regarding re-output, for example, an output destination is changed (e.g. copy function to fax transmission function).

BRIEF SUMMARY

In an aspect of this disclosure, there is provided an image processing apparatus that improves the reusability of digital image data.

In another aspect, there is provided an image processing apparatus including an image reading unit obtaining digitized image data by reading a draft; an image writing unit printing image data on a transfer paper; a recording unit recording image data and attached information of image data; an external I/F unit transmitting and receiving image data and attached information of image data with an external device; a first image data processing unit processing image data from the image reading unit; a second image data processing unit processing image data from the recording unit or the external I/F unit; a bus controlling unit providing connections among the units, in which the first image data processing unit matches the characteristics of the image data, input from the image reading unit, to prescribed characteristics so that the matched image data are usable for both the image writing unit and the external device and are recorded in the recording unit; and the second image data processing unit converts the image data stored in the recording unit so that the image data are made reusable for both the image writing unit and the external device by converting the characteristics of the image data into the characteristics suitable for both the output of the image writing unit and the external I/F unit.

In another aspect, there is provided an image processing apparatus in which the first image data processing unit changes the output settings of the image data recorded in the recording unit so that the image data are reusable when the image data are output to the image writing unit or the external device. The characteristics of the image data input from the image reading unit are matched to prescribed characteristics so that the image data recorded in the recording unit can be reusable for the image writing unit or the external device when the image data are output thereto.

In another aspect, there is provided an image processing apparatus in which the second image data processing unit matches the characteristics of the image data input from the external I/F unit to prescribed characteristics so that the matched image data are usable for both the image writing unit and the external device and are recorded in the recording unit; and converts the image data stored in the recording unit so that the image data are reusable for both the image writing unit and the external device by converting the characteristics of the image data into the characteristics suitable for both the output of the image writing unit and the external I/F unit.

In another aspect, there is provided an image processing apparatus in which the second image data processing unit changes the output settings of the image data recorded in the recording unit so that the image data are reusable for image writing unit or the external device when the image data are output thereto by matching the characteristics of the image data input from the image reading unit to prescribed characteristics so that the image data recorded in the recording unit can be made reusable for the image writing unit or the external device when the image data are output thereto.

In another aspect, there is provided an image processing apparatus in which, when the image data read from a draft by a user are recorded in the recording unit and reused and even when an image quality mode to be used when the image data are reused is designated when the image data are input from the draft, the first image data processing unit matches the image quality of the image data input from the image reading unit to a prescribed image quality so that the setting of an image quality mode of the image data can be changed when the image data are re-output to the image writing unit and the external device.

In another aspect, there is provided an image processing apparatus in which, when the image data read from the external I/F unit by a user are recorded in the recording unit and reused and even when an image quality mode to be used when the image data are reused is designated when the image data are input, the second image data processing unit matches the image quality of the image data input from the external I/F unit to a prescribed image quality so that the setting of an image quality mode of the image data can be changed when the image data are re-output to the image writing unit and the external device.

In another aspect, there is provided an image processing apparatus in which, when image data read from a draft by a user are neither recorded nor reused, the first image data processing unit converts the characteristics of the image data into the characteristics according to the setting of the picture quality mode used when the image data are output.

In another aspect, there is provided an image processing apparatus in which, when image data input from the external I/F unit by a user are neither recorded nor reused, the second image data processing unit converts the characteristic of the image data into the characteristics according to the setting of the picture quality mode used when the image data are output.

In another aspect, there is provided an image processing method including an image reading step of obtaining digitized image data by reading a draft; an image writing step of printing image data on a transfer paper; a recording step of recording image data and attached information of image data; an external I/F step of transmitting and receiving image data and attached information of image data with an external device; a first image data processing step of processing the image data from the image reading step; a second image data processing step of processing image data from the recording step or the external I/F step; and a bus controlling step of exchanging data of the steps, in which, in the first image data processing step, the characteristics of the image data, input from the image reading step, are matched to prescribed characteristics so that the matched image data are usable in the image writing step and for the external device as well and are recorded in the recording step; and, in the second image data processing step, the image data stored in the recording unit are converted so that the image data are made reusable for any one of in the image writing step and for the external I/F step or both by converting the characteristics of the image data into the characteristics suitable in the image writing step and the external I/F step.

An image processing apparatus, according to one or more of the aforementioned aspects, performs a process to match the characteristics of the image data input by the image reading unit to prescribed characteristics so that the image data can be used for both the image writing unit and the external device; records the image data after unifying the characteristics in the recording unit; and performs processing on the image data so the image data are fit to be output to the image writing unit and the external I/F unit, thereby enabling the image data stored in the recording unit to be reused for both the image writing unit and the external device and improving the reusability of the digital image data.

BRIEF DESCRIPTION OF THE DRAWINGS

FIG. 8 is a sequence chart (No. 2) showing an exemplary process when image data are reused.

DETAILED DESCRIPTION OF THE PREFERRED EMBODIMENTS

Exemplary embodiments of the present invention are described below.

<System Configuration>

Figure 1:
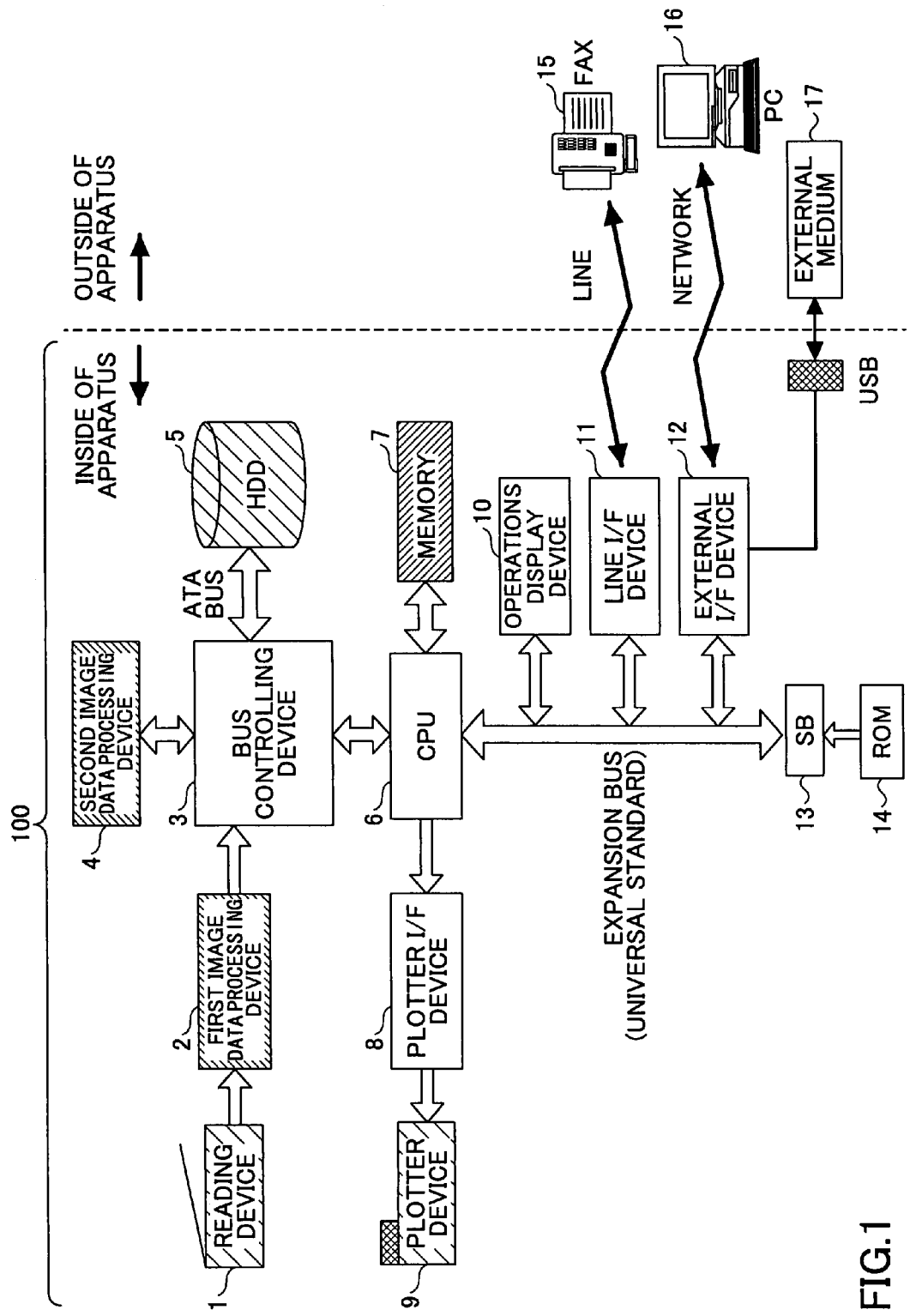
FIG. 1 is a drawing showing an exemplary configuration of a digital image processing apparatus according to one embodiment of the present invention.

FIG. 1 shows an exemplary configuration of a digital image processing apparatus 100 according to one embodiment of the present invention.

In FIG. 1, the digital image processing apparatus 100 includes a reading device 1, a first image data processing device 2, a bus controlling device 3, a second image data processing device 4, a HDD 5, a CPU 6, a memory 7, a plotter I/F device 8, a plotter device 9, an operations display device 10, a line I/F device 11, an external I/F device 12, a SB 13, and a ROM 14. Further, the digital image processing apparatus 100 is capable of connecting to an external FAX 15, a PC 16, and an external medium 17.

The reading device 1 includes a line sensor made of a photoelectric conversion device, an A/D converter, and their driving circuits, and generates 8-bit RGB data from a draft's gray information obtained by scanning the draft.

The first image data processing device 2 performs processing to match the characteristics of the digital image data, received from the reading device 1, to the predetermined characteristics and outputs the processed data. The image data having matched characteristics are stored in the digital image processing apparatus 100, the characteristics being changed to fit to the characteristics suitable for an output destination when reused afterward. The details are described below.

The bus controlling device 3 controls the data bus, exchanging various data such as image data and control commands and has a bridge function among plural different bus specifications. In the embodiment, the bus controlling device 3 is connected to the first and the second image data processing devices 2 and 4, respectively, and the CPU 6 through a PCI-Express bus and to the HDD 5 through an ATA bus, and is embedded in an ASIC.

The second image data processing device 4 performs processing on the digital image data, matched by the first image data processing device 1 to have predetermined characteristics to fit the output destination designated by a user and outputs the processed image data. The details are described below.

The HDD 5 is a large capacity recording device for storing electronic data, used, for example, in a desktop PC and records mainly digital image data and the attached information of the digital image data in the digital image processing apparatus 100. In the embodiment of the present invention, hard disks with ATA bus standardized by enhancing the IDE are used.

The CPU 6 is a microprocessor controlling the entire digital image processing apparatus 100. In the embodiment, an integrated CPU, having additional functions compared to the CPU core itself and having become more widely used lately, is used. In the embodiment, PMC's RM11100 with a connecting function of a general standard I/F and an integrated bus connecting function using a cross bar switch is used as the CPU.

The memory 7 is a volatile memory that stores data temporarily input and output to compensate the differences in data rates among plural bus specifications and the differences in processing speeds among connected parts. The memory 7 also temporarily stores a program and intermediate data when the CPU 6 controls the digital image processing apparatus 100. Since the CPU 6 is desired to perform at a high processing speed, the system is generally designed to be booted up by a boot program recorded in the ROM 14, and followed by a program loaded in the fast accessible memory 7. In the embodiment, a DIMM used in a standard computer is used as the memory 7.

The plotter I/F device 8 receives CMYK digital image data transmitted through a standard I/F integrated in the CPU 6 and performs a bus-bridge process to output the data to the proprietary I/F of the plotter device 9. In the embodiment, the standard I/F refers to the PCI-Express Bus.

The plotter device 9 receives the CMYK digital image data and outputs received image data to a transfer paper by way of an electronic picturing process using a laser beam.

The SB 13 refers to an electronic device called 'South Bridge', one of the chipsets used in a personal computer, and is a general purpose circuit of a bus-bridge function commonly used when a CPU system includes the PCI-Express and an ISA bridge.

The ROM 14 is a memory storing programs (including the boot program) used when the CPU 6 controls the digital image processing apparatus 100.

The operations display device 10 works as an interface between the digital image processing apparatus 100 and a user, including a LCD (Liquid Crystal Display Device) and key switches, displays the status of the apparatus and operation methods on the LCD, and detects key switch inputs from the user. In the embodiment, the operations display device 10 is connected to the CPU 6 through the PCI-Express bus.

The line I/F device 11 provides a connection between the PCI-Express bus and a telephone line, enabling the digital image processing apparatus 100 to connect to an external device to input and output data through the telephone line.

The FAX 15 is a typical facsimile machine, transmitting and receiving image data to and from the digital image processing apparatus 100 though the telephone line.

The external I/F device 12 provides a connection between the PCI-Express bus and an external device, enabling the digital image processing apparatus 100 to connect to the external device to input and output data. In the embodiment, as an I/F connected to the external I/F device 12, a network (Ethernet (trademark)) and a USB are used. Namely, the digital image processing apparatus 100 is connected to the network and an external medium 17, such as a SD card, through the external I/F device 12.

The PC 16 is a so-called personal computer, enabling a user to control various items of and input and output image data to and from the digital image processing apparatus 100 by way of application programs installed in the personal computer.

The external medium 17 is so-called a memory device such as the SD card, storing various electronic data items including image data. A user inputs and outputs image data between the external medium 17 and the digital image processing apparatus 100.

<General Operations>

(Scanner Input→Copy Operation)

A user sets a draft on the reading device 1, sets some items including a desired mode, and operates the operations display device 10 to start copying.

The operations display device 10 converts the information input by the user into control command data used in the apparatus and issues the control command data. The issued control command data are sent to the CPU 6 through the PCI-Express bus.

Figure 2:
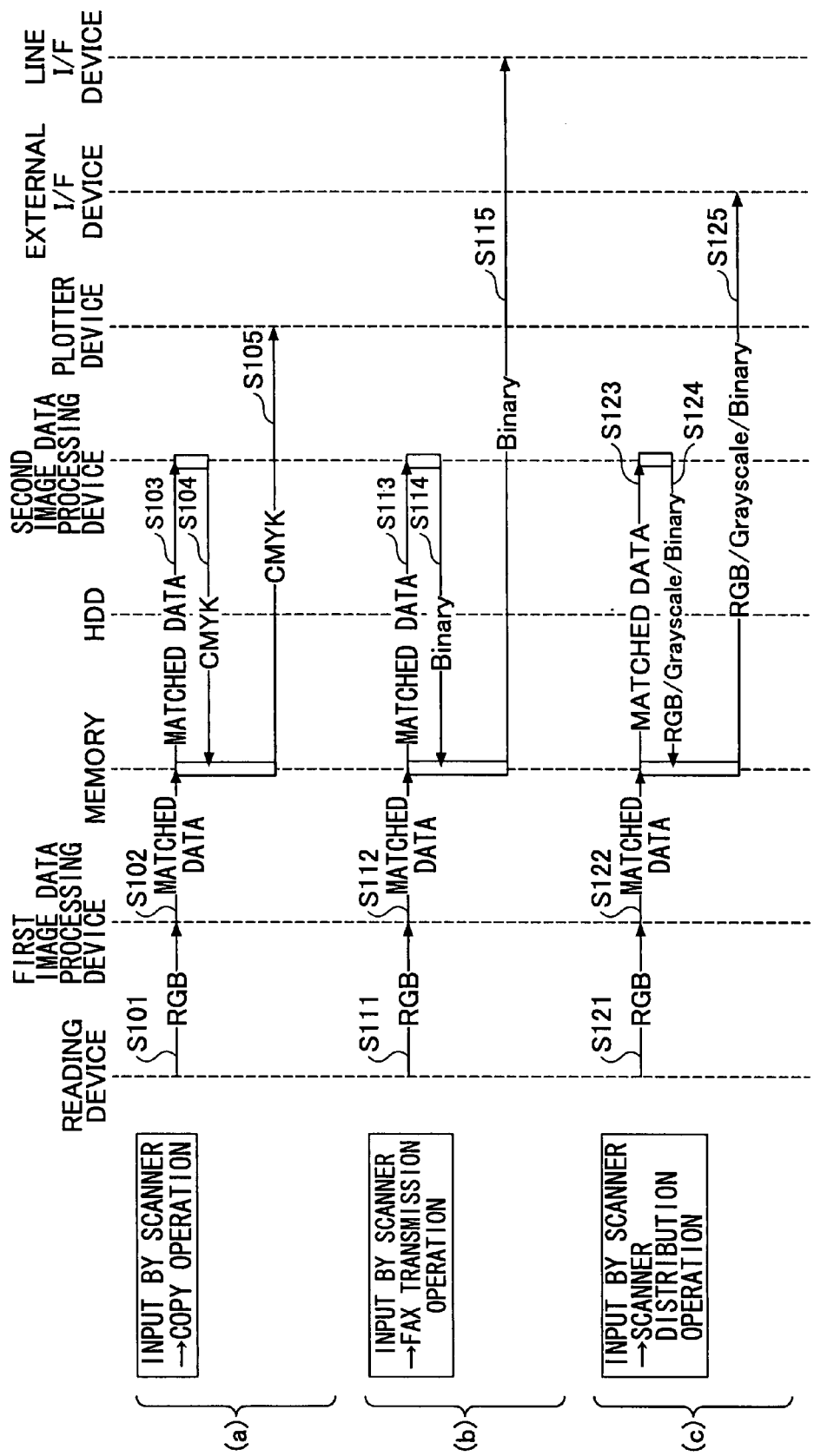
FIG. 2 is a sequence chart (No. 1) showing an exemplary process in a general operation.

The CPU 6 executes a program of a copy operation process according to the control command data to start copying and sequentially proceeds with the settings and operations necessary for the copying. The operation process is described below. FIG. 2A shows a sequence chart of the operation process.

The reading device 1 obtains 8-bit RGB digital image data by scanning a draft (step S101). The first image data processing device 2 matches the characteristics of the image data to the predetermined characteristics and then transmits matched image data to the bus controlling device 3 (step S102).

The bus controlling device 3 receives the RGB image data from the first image data processing device 2 and then records the RGB image data in the memory 7 through the CPU 6.

Next, the RGB image data stored in the memory 7 are transmitted to the second image data processing device 4 through the CPU 6 and the bus controlling device 3 (step S103).

The second image data processing device 4 converts received RGB image data into CMYK image data for plotter output and outputs the CMYK image data (step S104).

The bus controlling device 3 receives the CMYK image data from the second image data processing device 4 and then records the CMYK image data in the memory 7 through the CPU 6.

Next, the CMYK image data stored in the memory 7 are transferred to the plotter device 9 through the CPU 6 and the plotter I/F device 8 (step S105).

The plotter device 9 outputs received CMYK image data to a transfer paper to generate a copy of the draft.

(Scanner Input→Fax Transmission Operation)

A user sets a draft on the reading device 1, sets some items including a desired mode, and operates the operations display device 10 to start faxing.

The operations display device 10 converts the information input by the user into control command data used in the apparatus and issues the control command data. The issued control command data are sent to the CPU 6 through the PCI-Express bus.

The CPU 6 executes a program of a fax operation process, according to the control command data to start faxing, and sequentially proceeds with settings and operations necessary for the faxing. The operation process is described below. FIG. 2B shows a sequence chart of the fax operation process.

The reading device 1 obtains 8-bit RGB digital image data by scanning a draft (step S111). The first image data processing device 2 matches the characteristics of the image data to the predetermined characteristics and then transmits the matched image data to the bus controlling device 3 (step S112).

The bus controlling device 3 receives the RGB image data from the first image data processing device 2 and then records the RGB image data in the memory 7 through the CPU 6.

Next, the RGB image data stored in the memory 7 are transmitted to the second image data processing device 4 through the CPU 6 and the bus controlling device 3 (step S113).

The second image data processing device 4 converts received RGB image data into monochrome binary image data for fax transmission and outputs the monochrome binary image data (step S114).

The bus controlling device 3 receives the monochrome binary image data from the second image data processing device 4 and then records the monochrome binary image data in the memory 7 through the CPU 6.

Next, the monochrome binary image data stored in the memory 7 are transferred to the line I/F device 11 through the CPU 6 (step S115).

The line I/F device 11 outputs the received monochrome binary image data to the FAX 15 through the telephone line.

(Scanner Input→Scanner Distribution Operation)

A user sets a draft on the reading device 1, sets some items including a desired mode, and operates the operations display device 10 to start scanner distribution.

The operations display device 10 converts the information input by the user into control command data used in the apparatus and issues the control command data. The issued control command data are sent to the CPU 6 through the PCI-Express bus.

The CPU 6 executes a program of a scanner distribution operation process, according to the control command data to start scanner distribution, and sequentially proceeds with settings and operations necessary for the scanner distribution. The operation process is described below. FIG. 2C shows a sequence chart of the operation process.

The reading device 1 obtains 8-bit RGB digital image data by scanning a draft (step S121). The first image data processing device 2 matches the characteristics of the image data to the predetermined characteristics and then transmits the matched image data to the bus controlling device 3 (step S122).

The bus controlling device 3 receives the RGB image data from the first image data processing device 2 and then records the RGB image data in the memory 7 through the CPU 6.

Next, the RGB image data stored in the memory 7 are transmitted to the second image data processing device 4 through the CPU 6 and the bus controlling device 3 (step S123).

The second image data processing device 4 converts the received RGB image data into the image data (for example, RGM multi-level, gray scale, and monochrome binary) for scanner distribution and outputs the image data (step S124).

The bus controlling device 3 receives the image data from the second image data processing device 4 and then records the image data in the memory 7 through the CPU 6.

Next, the image data stored in the memory 7 are transferred to the external I/F device 12 through the CPU 6 (step S125).

The external I/F device 12 outputs received image data to the PC 16 connected through the network.

(External Medium Input→Copy Operation)

A user connects an external medium 17, storing image data, through the external I/F device 12, sets some items including a desired mode, and operates the operations display device 10 to start copying.

The operations display device 10 converts the information input by the user into control command data used in the apparatus and issues the control command data. The issued control command data are sent to the CPU 6 through the PCI-Express bus.

Figure 3:
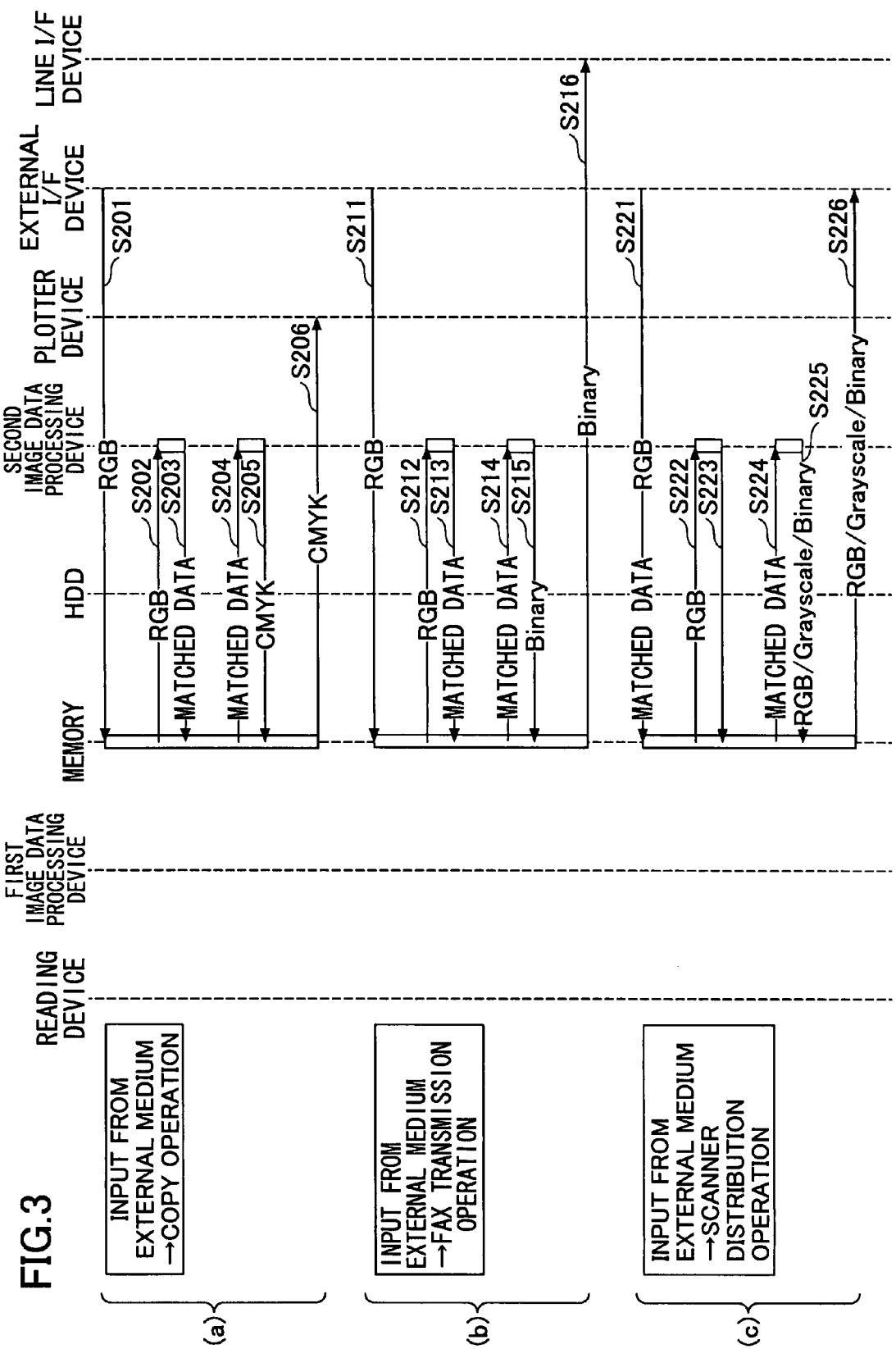
FIG. 3 is a sequence chart (No. 2) showing an exemplary process in a general operation.

The CPU 6 executes a program of a copy operation process, according to the control command data to start copying, and sequentially proceeds with settings and operations necessary for the copying. The operation process is described below. FIG. 3A shows a sequence chart of the operation process.

Eight-bit RGB digital image data are obtained from the external medium 17 through the external I/F device 12 (step S201) and then are stored in the memory 7 through the CPU 6.

The RGB image data stored in the memory 7 are transmitted to the second image data processing device 4 through the CPU 6 and the bus controlling device 3 (step S202).

The second image data processing device 4 matches the characteristics of the received image data to the predetermined characteristics and then transmits the matched image data (step S203).

The bus controlling device 3 receives the matched RGB image data from the second image data processing device 4 and then records the RGB image data in the memory 7 through the CPU 6.

Next, the matched RGB image data stored in the memory 7 are transferred to the second image data processing device 4 through the CPU 6 and the Plotter I/F device 8 (step S204).

The second image data processing device 4 converts matched RGB image data into CMYK image data for plotter output and outputs the CMYK image data (step S205).

The bus controlling device 3 receives the CMYK image data from the second image data processing device 4 and then records the RGB image data in the memory 7 through the CPU 6.

Next, the CMYK image data stored in the memory 7 are transferred to the plotter device 9 through the CPU 6 and the plotter I/F device 8 (step S206)

The plotter device 9 outputs received CMYK image data to a transfer paper to generate a copy of the image data recorded in the external medium 17.

(External Medium Input→Fax Transmission Operation)

A user connects an external medium 17, storing image data, through the external I/F device 12, sets some items including a desired mode, and operates the operations display device 10 to start faxing.

The operations display device 10 converts the information input by the user into control command data used in the apparatus and issues the control command data. The issued control command data are sent to the CPU 6 through the PCI-Express bus.

The CPU 6 executes a program of a fax operation process, according to the control command data to start faxing, and sequentially proceeds with settings and operations necessary for the faxing. The operation process is described below. FIG. 3B shows a sequence chart of the operation process.

Eight-bit RGB digital image data are obtained from the external medium 17 through the external I/F device 12 (step S211) and then are stored in the memory 7 through the CPU 6.

The RGB image data stored in the memory 7 are transmitted to the second image data processing device 4 through the CPU 6 and the bus controlling device 3 (step S212).

The second image data processing device 4 matches the characteristics of the received image data to the predetermined characteristics and then transmits the matched image data (step S213).

The bus controlling device 3 receives the matched RGB image data from the second image data processing device 4 and then records the RGB image data in the memory 7 through the CPU 6.

Next, the matched RGB image data stored in the memory 7 are transferred to the second image data processing device 4 through the CPU 6 and the plotter I/F device 8 (step S214).

The second image data processing device 4 converts matched RGB image data into monochrome binary image data for fax transmission and outputs the image data (step S215).

The bus controlling device 3 receives the monochrome binary image data from the second image data processing device 4 and then records the image data in the memory 7 through the CPU 6.

Next, the monochrome binary image data stored in the memory 7 are transferred to the line I/F device 11 through the CPU 6 (step S216).

The line I/F device 11 outputs the received monochrome binary image data to the FAX 15 connected through the network.

(External Medium Input→Scanner Distribution Operation)

A user connects an external medium 17, storing image data, through the external I/F device 12, sets some items including a desired mode, and operates the operations display device 10 to start the scanner distribution.

The operations display device 10 converts the information input by the user into control command data used in the apparatus and issues the control command data. The issued control command data are sent to the CPU 6 through the PCI-Express bus.

The CPU 6 executes a program of a scanner distribution operation process, according to the control command data to start the scanner distribution, and sequentially proceeds in the settings and operations necessary for the scanner distribution. The operation process is described below. FIG. 3C shows a sequence chart of the operation process.

Eight-bit RGB digital image data are obtained from the external medium 17 through the external I/F device 12 (step S221) and then are stored in the memory 7 through the CPU 6.

The RGB image data stored in the memory 7 are transmitted to the second image data processing device 4 through the CPU 6 and the bus controlling device 3 (step S222).

The second image data processing device 4 matches the characteristics of received image data to the predetermined characteristics and then transmits the matched image data (step S223).

The bus controlling device 3 receives the matched RGB image data from the second image data processing device 4 and then records the RGB image data in the memory 7 through the CPU 6.

Next, the matched RGB image data recorded in the memory 7 are transferred to the second image data processing device 4 through the CPU 6 and the bus controlling device 3 (step S224).

The second image data processing device 4 converts matched RGB image data into the image data (for example, RGM multi-level, gray scale, and monochrome binary) for scanner distribution and outputs the image data (step S225).

The bus controlling device 3 receives the image data from the second image data processing device 4 and then records the image data in the memory 7 through the CPU 6.

Next, the image data recorded in the memory 7 are transferred to the external I/F device 12 through the CPU 6 (step S226).

The external I/F device 12 outputs the received image data to the PC 16 connected through the network.

<Operations of Reusing Image Data: No. 1>

Next, the operations in cases where image data obtained by scanning a draft are recorded and stored in the digital image processing apparatus 100 and then the image data are reused are described below.

(Copy Operation+Recording and Storing Operation to the HDD)

A user sets a draft on the reading device 1, sets some items including a desired mode, and operates the operations display device 10 to start copying.

The operations display device 10 converts the information input by the user into control command data used in the apparatus and issues the control command data. The issued control command data are sent to the CPU 6 through the PCI-Express bus.

Figure 4:
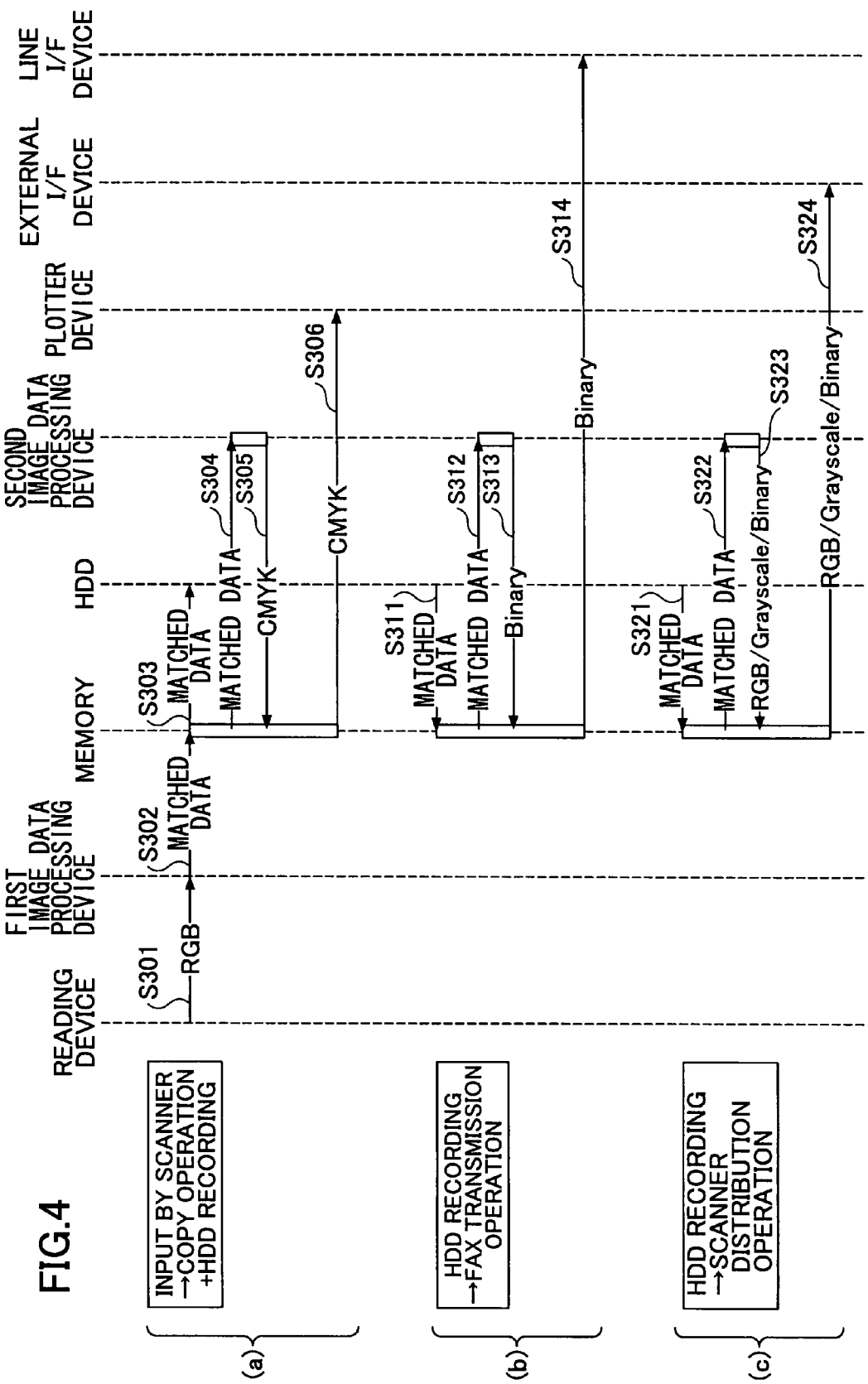
FIG. 4 is a sequence chart (No. 1) showing an exemplary process when image data are reused.

The CPU 6 executes a program of a copy operation process, according to the control command data to start copying, and sequentially proceeds with settings and operations necessary for the copying. The operation process is described below. FIG. 4A shows a sequence chart of the operation process.

The reading device 1 obtains 8-bit RGB digital image data by scanning a draft (step S301). The first image data processing device 2 matches the characteristics of the image data to predetermined characteristics and then transmits the matched image data to the bus controlling device 3 (step S302).

Figure 5:
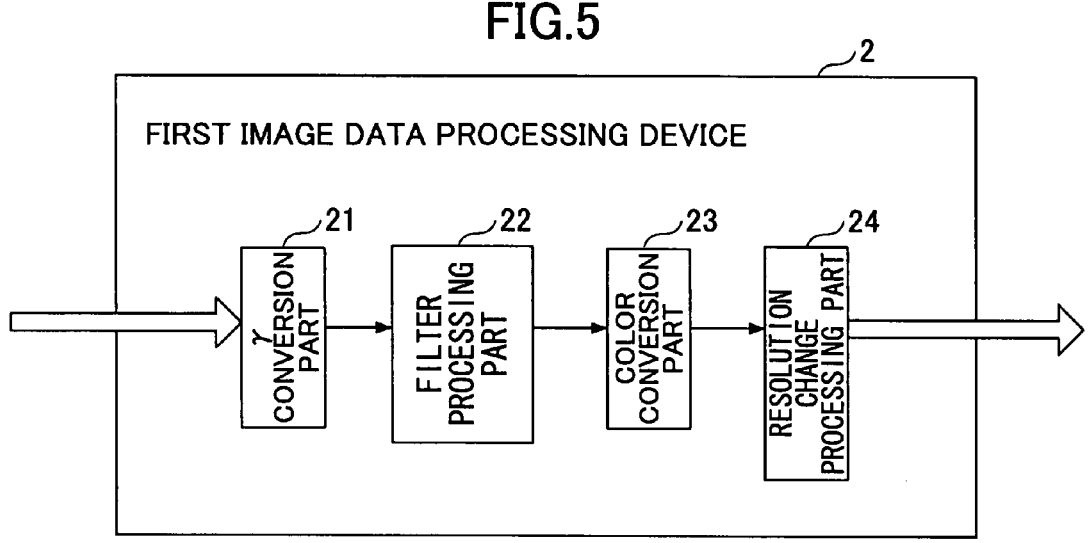
FIG. 5 is a drawing showing an exemplary internal configuration of a first image data processing device.

FIG. 5 shows an internal configuration of the first image data processing device 2, and the operation process is described sequentially.

A γ conversion part 21 matches the brightness of the RGB image data received from the reading device 1 to the brightness of predetermined characteristics. In the embodiment, the predetermined characteristics are brightness linear characteristics.

Figure 6:
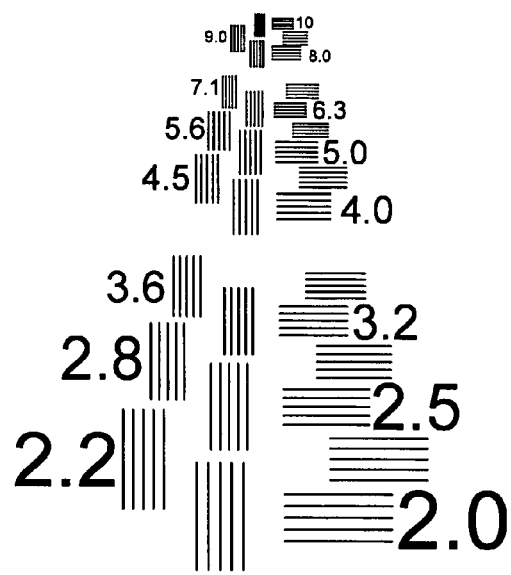
FIG. 6 is a drawing showing a reference chart.

A filter processing part 22 matches the sharpness of the RGB image data to the sharpness of predetermined characteristics. In the embodiment, the matching is made so that the sharpness of each line corresponds to the predetermined MTF characteristic value when a reference chart as shown in FIG. 6 is scanned.

A color conversion part 23 matches the colors of RGB image data to the colors of predetermined characteristics. In the embodiment, the matching is performed so that the color space of the RGB image data corresponds to the RGB color space defined by Adobe Systems, Inc.

A resolution change processing part 24 matches the size (resolution) of RGB image data to the size of predetermined characteristics. In the embodiment, the size (resolution) of the predetermined characteristics is 600 dpi.

Referring back to FIG. 4A, the bus controlling device 3 receives the RGB image data from the first image data processing device 2 and then records the RGB image data in the memory 7 through the CPU 6.

The image data recorded in the memory 7 are transmitted to the HDD 5 through the CPU 6 and the bus controller device 3 (step S303) and are recorded and stored in the HDD 5.

After the above step, the RGB image data in the memory 7 are output to the plotter device 9 by way of the second image data processing device 4 (steps S304 through S306) and the copy of the draft is generated.

Figure 7:
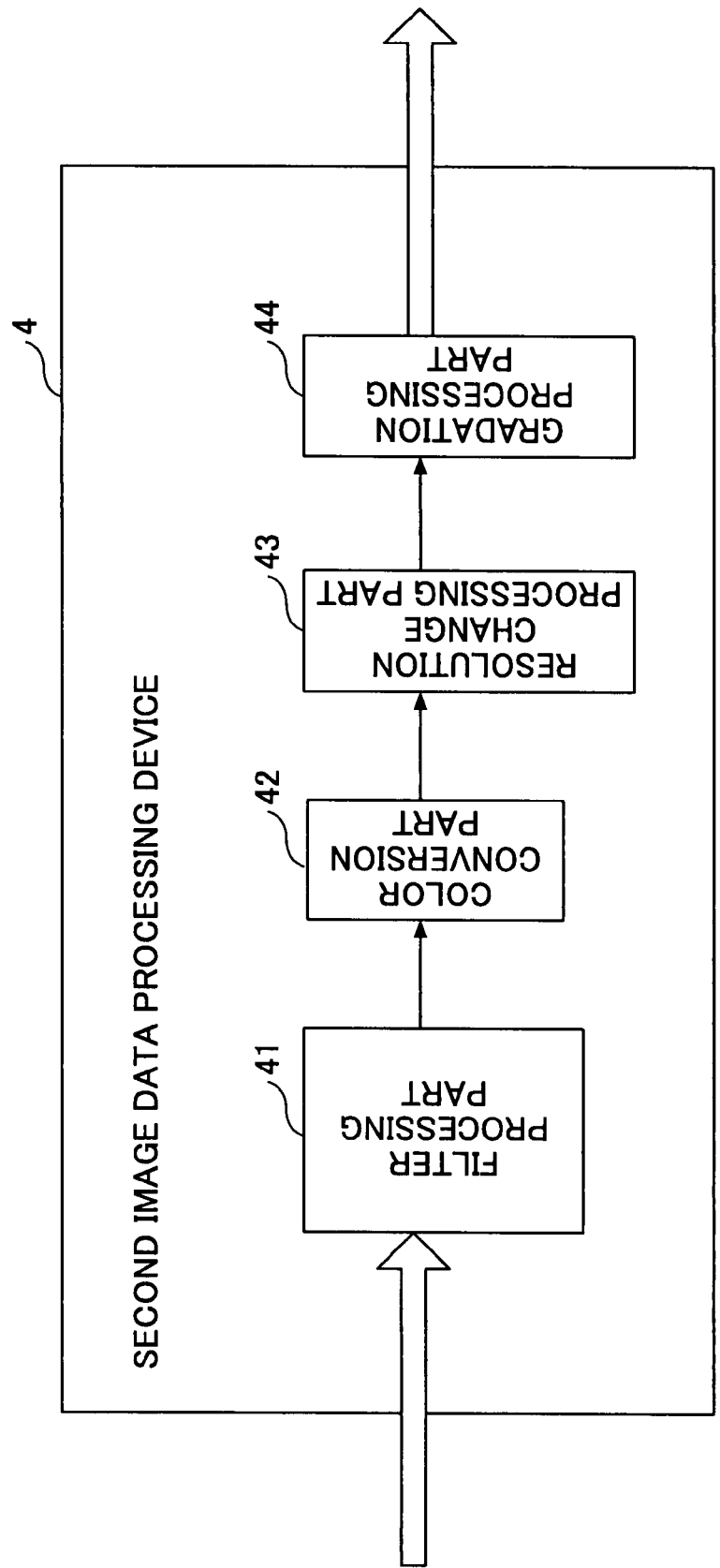
FIG. 7 is a drawing showing an exemplary internal configuration of a second image data processing device.

FIG. 7 shows an internal configuration of the second image data processing device 4, and the operation process is described sequentially.

A filter processing part 41 corrects the sharpness of the RGB image data to improve the reproducibility of the image data upon output to the plotter device 9. More specifically, the sharpness is changed and/or a smoothing process is performed based on the desired mode information. For example, in a character mode, sharpness is increased to clarify and emphasize the characters, and in a picture mode, smoothing process is performed to a smooth the gradation of the picture.

A color conversion part 42 receives the 8-bit RGB data and then converts the data into 8-bit CMYK data. Chroma of the data are also adjusted based on a user's desired mode information.

A resolution change processing part 43 changes the size (resolution) of CMYK image data based on the reproduction capability of the plotter device 9. In the embodiment, since the performance of the plotter device 9 is 600 dpi, no specific conversion is performed.

A gradation processing part 44 receives 8-bit CMYK image data and then performs a gradation number converting process based on the capability of gradation process of the plotter device 9. In the embodiment, the gradation number converting process is performed by applying the error diffusion method as one of pseudo half-tone processes to each 2 bits of CMYK data.

(Data Recording→Fax Transmission Operation)

Next, operations of reusing the image data recorded and stored in the HDD 5 are described.

To start fax transmission, a user sets some items including a desired mode and operates the operations display device 10 to fax the image data recorded in the HDD 5 upon completion of the previous copy operation.

The operations display device 10 converts the information input by the user into control command data used in the apparatus and issues the control command data. The issued control command data are sent to the CPU 6 through the PCI-Express bus.

The CPU 6 executes a program of a fax operation process, according to the control command data to start faxing, and sequentially proceeds with settings and operations necessary for the faxing. The operation process is described below. FIG. 4B shows a sequence chart of the operation process.

The bus controlling device 3 outputs the RGB image data recorded in the HDD 5 to the memory 7 through the CPU 6 (step S311).

Then, as described above, the RGB image data in the memory 7 are output to the line I/F device 11 through the second image data processing device 4 (steps S312 through S314) and the FAX transmission is performed.

The above operations in the second image data processing device 4 shown in FIG. 7 are sequentially described below.

A filter processing part 41 corrects the sharpness of the RGB image data to improve the reproducibility of the image data upon fax transmission. More specifically, the sharpness is changed and/or a smoothing process is performed based on the desired mode information. For example, in a character mode, sharpness is increased to clarify and emphasize the characters, and in a picture mode, a smoothing process is performed to smooth the gradation of the picture.

A color conversion part 42 receives the 8-bit RGB data and then converts the data into 8-bit single color (monochrome) data generally used for a FAX.

A resolution change processing part 43 changes the size (resolution) of the monochrome image data into a size (resolution) used in the FAX. In the embodiment, the converted size is main scanning 200 dpi×sub scanning 100 dpi.

A gradation processing part 44 receives the monochrome 8-bit image data and then performs a gradation number converting process based on the capability of gradation process used in the FAX. In the embodiment, binary gradation based on the error diffusion method as one of pseudo half-tone processes is used.

(Data Recording→Scanner Distribution Operation)

To start the scanner distribution, a user sets some items including a desired mode and operates the operations display device 10 to read the image data recorded in the HDD 5 upon completion of the previous copy operation.

The operations display device 10 converts the information input by the user into control command data used in the apparatus and issues the control command data. The issued control command data are sent to the CPU 6 through the PCI-Express bus.

The CPU 6 executes a program of a scanner distribution process, according to the control command data to start the scan distribution, and sequentially proceeds with settings and operations necessary for the scan distribution. The operation process is described below. FIG. 4C shows a sequence chart of the operation process.

The bus controlling device 3 outputs the RGB image data recorded in the HDD 5 to the memory 7 through the CPU 6 (step S321).

Then, as described above, the RGB image data in the memory 7 are output to the external I/F device 12 through the second image data processing device 4 (steps S322 through S324), and the scan distribution is performed.

The above operations in the second image data processing device 4 shown in FIG. 7 are sequentially described below.

A filter processing part 41 corrects the sharpness of the RGB image data to improve the reproducibility of the image data upon scanner distribution. More specifically, the sharpness is changed and/or a smoothing process is performed based on the desired mode information. For example, in a character mode, sharpness is increased to clarify and emphasize the characters, and in a picture mode, a smoothing process is performed to smooth the gradation of the picture.

A color conversion part 42 receives the 8-bit RGB data and then converts the data into a prescribed color space. In the embodiment, the converted color space is the 8-bit sRGB color space generally used in scanner distribution.

A resolution change processing part 43 changes the size (resolution) of the sRGB image data to fit to the designated size (resolution) used in a prescribed scanner distribution. In the embodiment, the converted size is main scanning 200 dpi ×sub scanning 200 dpi.

A gradation processing part 44 performs a gradation number converting process based on the capability of gradation processing used in the prescribed scanner distribution. In the embodiment, 8-bit RGB 16 million colors are assumed to be designated, and no specific gradation process is performed.

(Operations and Effects of this Embodiment)

As described above, according to the embodiment of the present invention, it is possible to select a different output destination application other than the input source application without changing the image quality compared with a case of usual operation (that is, the output destination is already selected when data are recorded) when data recorded and stored in the digital image processing apparatus 100. Therefore reusability of data are remarkably improved. Namely, when a user outputs the image data recorded and stored in an MFP, the user can output the data to a different application than the application used when the image data are recorded and stored in the MFP (for example, data are recorded using a copy application and are output for fax transmission).

Further, according to the configuration of the embodiment, the first image data processing device 2 performs common functions used for each output designation. Namely, it is possible to implement functions, having the same purpose and commonly used for each of output destinations, (for example, the sharpness adjusting function in a copy application and the sharpness adjusting function in a fax application can be implemented in the same part), in the same part of the configuration, thereby enabling functions to be implemented in the configuration effectively.

Still further, according to the configuration, the image data processes for the image data obtained through the reading device 1 can be divided and modularized into, for example, a matching module performing a matching process and an output module performing a process corresponding to each output destination. Because of the feature, it is thus possible to meet various requirements from users by providing various types of the first image data processing devices 2 only, based on the combination of output devices necessary for each user, without changing any other main parts of the apparatus. In addition, for example, as technology improves and a new requirement is added, it is possible to respond to the requirement by upgrading the first image data processing device 2 only. In this manner, it is possible to effectively meet a user's requests on the output devices.

Still further, from the development point of view, because of the configuration, it is possible to separately develop, debug, and change parameters for each of modules including a module performing the matching process for the image data obtained through the reading device 1 and a module performing the output process corresponding to each output destination, thereby improving the development efficiency. As a result, the development period can be shortened.

In addition, since the characteristics of the image data recorded by the first image data processing device 2 are matched to each other, it is possible to use the recorded data with any class of MFPs, from large-sized to small-sized. Namely, over every class of MFPs, it is possible to output the image data to a different application than the application used when recording and storing the image data in an MFP.

<Operations of Reusing Image Data: No. 2>

Next, another operation when image data are reused is described.

(Scanner Distribution Operation+Recording and Storing Operation in the HDD)

Since the operations corresponding to the scanner distribution operation and the operations up to the recording and storing data in the HDD5 are the same as in the "No. 1", the descriptions of the operations are omitted.

Next, operations of reusing the image data recorded and stored in the HDD 5 are described.

(Scanner Distribution Re-Designation Operations: Setting Change)

A user operates the operations display device 10 to start scanner distribution of the image data recorded in the HDD 5. During the operations, the setting including a mode designated when the data are recorded in the HDD5 is changed to a different setting.

The operations display device 10 converts the information input by the user into control command data used in the apparatus and issues the control command data. The issued control command data are sent to the CPU 6 through the PCI-Express bus.

The CPU 6 executes a program of a scanner distribution process, according to the control command data to start a scan distribution, and sequentially proceeds with settings and operations necessary for the scan distribution. The operation process is described below.

The bus controlling device 3 outputs the RGB image data recorded in the HDD 5 to the memory 7 through the CPU 6.

Then, as described above, the RGB image data in the memory 7 are output to the line I/F device 11 through the second image data processing device 4, and the scan distribution is performed.

The above operations in the second image data processing device 4 shown in FIG. 7 are sequentially described below.

The filter processing part 41 corrects the sharpness of the RGB image data to improve the reproducibility of the image data upon scanner distribution. More specifically, the sharpness is changed and/or a smoothing process is performed based on the desired mode information. For example, in a character mode, sharpness is increased to clarify and emphasize the characters, and in a picture mode, smoothing process is performed to smooth the gradation of the picture.

The color conversion part 42 receives the 8-bit RGB data and then converts the data into a prescribed color space. In the embodiment, since the re-designated mode setting is monochrome, the converted setting is a single color (monochrome) 8-bit color space.

A resolution change processing part 43 changes the size (resolution) of the monochrome image data to fit the designated size (resolution) used in a prescribed scanner distribution. In the embodiment, the converted size is main scanning 400 dpi×sub scanning 400 dpi, according to the re-designated resolution.

A gradation processing part 44 performs a gradation number converting process based on the capability of a gradation process used in the prescribed scanner distribution. In the embodiment, binary gradation based on the error diffusion method as one of pseudo half-tone processes is used, according to the re-designation mode.

(Operations and Effects of this Embodiment)

As described above, according to the embodiment of the present invention, it is possible to select a different output destination application other than the input source application without changing the image quality compared with a case of a usual operation (that is, the output destination is already selected when data are recorded) when data are recorded and stored in the digital image processing apparatus 100. Therefore reusability of data is remarkably improved. Namely, when a user outputs the image data recorded and stored in an MFP, the user can change the setting to output the data to a different application other than the application used when the image data are recorded and stored in the MFP (for example, data are recorded by reducing from the size of two pieces of A4-sized draft data to one piece of A4-sized→two pieces of A4-sized draft data are replaced by two pieces of A4-sized transfer papers).

Further, according to the configuration, the image data processes for the image data obtained through the reading device 1 can be divided and modularized into, for example, a matching module performing a matching process and an output module performing a process corresponding to each output destination. Because of this feature, it is thus possible to meet various requirements of functions of output devices from users by providing various types of the second image data processing devices 4 only, based on the combination of output devices necessary for each user, without changing any other main parts of the apparatus. In addition, for example, as technology improves and a new requirement is added, it is possible to respond to the requirement by upgrading the second image data processing device 4 only. In this manner, it is possible to effectively meet to a user's requests for the output devices.

Still further, from the development point of view, because of the configuration, it is possible to separately develop, debug, and change parameters each of modules including a module performing the matching process for the image data obtained through the reading device 1 and modules performing the output process corresponding to each of output destinations, thereby improving the development efficiency. As a result, the development period can be shortened.

In addition, since the characteristics of the image data recorded by the first image data processing device 2 are matched to each other, it is possible to use the recorded data by any class of MFPs, from large-sized to small-sized. Namely, over every class of MFPs, it is possible to output the image data to a different application than the application used when recording and storing the image data in an MFP.

<Operations of Reusing Image Data: No. 3>

Next, the operations in cases where image data recorded in the external medium 17 are recorded and stored in the digital image processing apparatus 100 and then the image data are reused are described below.

(Copy Operation+Recording and Storing Operation in the HDD)

A user connects an external medium 17, storing image data, through the external I/F device 12, sets some items including a desired mode, and operates the operations display device 10 to start copying.

The operations display device 10 converts the information input by the user into control command data used in the apparatus and issues the control command data. The issued control command data are sent to the CPU 6 through the PCI-Express bus.

The CPU 6 executes a program of a copy operation process, according to the control command data to start copying, and sequentially proceeds in the settings and operations necessary for the copying. The operation process is described below. FIG. 8A shows a sequence chart of the operation process.

Eight-bit RGB digital image data are obtained from the external medium 17 through the external I/F device 12 (step S401) and then are recorded in the memory 7 through the CPU 6.

The RGB image data recorded in the memory 7 are transmitted to the second image data processing device 4 through the CPU 6 and the bus controlling device 3 (step S402).

The second image data processing device 4 matches the characteristics of the received RGB image data to predetermined characteristics and then transmits the matched image data (step S403).

The above operations in the second image data processing device 4 shown in FIG. 7 are sequentially described below.

The filter processing part 41 matches the sharpness of the RGB image data to the sharpness of predetermined characteristics. In the embodiment, the matching is performed so that the sharpness of each line corresponds to the predetermined MTF characteristic value when a reference chart shown as in FIG. 6 is scanned.

The color conversion part 42 matches the colors of RGB image data to the colors of predetermined characteristics. In the embodiment, the matching is performed so that the color space of the RGB image data corresponds to the RGB color space defined by Adobe Systems, Inc.

The resolution change processing part 43 matches the size (resolution) of RGB image data to the size of a predetermined characteristic. In the embodiment, the size of the predetermined characteristic is 600 dpi.

A gradation processing part 44 does not perform any process because a required process in the embodiment is to match the characteristics only.

The bus controlling device 3 receives the matched RGB image data from the second image data processing device 4 and then records the RGB image data in the memory 7 through the CPU 6 again.

The image data recorded in the memory 7 are transmitted to the HDD 5 through the CPU 6 and the bus controller device 3 (step S404), and the image data are recorded and stored in the HDD 5.

After the above step, the RGB image data in the memory 7 are output to the plotter device 9 by way of the second image data processing device 4 (steps S405 through S407) and the copy of the draft is generated.

The above operations in the second image data processing device 4 shown in FIG. 7 are sequentially described below.

The filter processing part 41 corrects the sharpness of the RGB image data to improve the reproducibility of the image data upon output to the plotter device 9. More specifically, the sharpness is changed and/or a smoothing process is performed based on the desired mode information. For example, in a character mode, sharpness is increased to clarify and emphasize the characters, and in a picture mode, a smoothing process is performed to smooth the gradation of the picture.

The color conversion part 42 receives 8-bit RGB data and then converts the data into 8-bit CMYK data which is a color space used in a plotter device. During the process, the chroma level of the data is adjusted according to the mode information requested by the user.

A resolution change processing part 43 changes the size (resolution) of the CMYK image data to fit to the designated size (resolution) according to the capability of reproducibility of the plotter device 9. In the embodiment, no specific conversion is made since the capability of the plotter device 9 is 600 dpi output.

A gradation processing part 44 receives 8-bit CMYK image data and then performs a gradation number converting process based on the capability of gradation processing of the plotter device 9. In the embodiment, the number of gradations is converted to produce the 2-bit CMYK image data based on the error diffusion method as one of pseudo half-tone processes, according to the re-designation mode.

Next, operations of reusing the image data recorded and stored in the HDD 5 are described.

(Data Recording→Fax Transmission Operation)

To start fax transmission, a user sets some items including a desired mode and operates the operations display device 10 to reuse the image data recorded in the HDD5 upon the previous copy operation.

The operations display device 10 converts the information input by the user into control command data used in the apparatus and issues the control command data. The issued control command data are sent to the CPU 6 through the PCI-Express bus.

The CPU 6 executes a program of a fax operation process, according to the control command data to start faxing, and sequentially proceeds with settings and operations necessary for the faxing. The operation process is described below. FIG. 8B shows a sequence chart of the operation process.

The bus controlling device 3 outputs the RGB image data recorded in the HDD 5 to the memory 7 through the CPU 6 (step S411).

Then, as described above, the RGB image data in the memory 7 are output to the line I/F device 11 through the second image data processing device 4 (steps S412 through S414), and the FAX transmission is performed.

The above operations in the second image data processing device 4 shown in FIG. 7 are sequentially described below.

A filter processing part 41 corrects the sharpness of the RGB image data to improve the reproducibility of the image data upon fax transmission. More specifically, the sharpness is changed and/or a smoothing process is performed based on the desired mode information. For example, in a character mode, sharpness is increased to clarify and emphasize the characters, and in a picture mode, a smoothing process is performed to smooth the gradation of the picture.

A color conversion part 42 receives 8-bit RGB data and then converts the data into 8-bit single color (monochrome) data used in a FAX.

A resolution change processing part 43 changes the size (resolution) of the monochrome image data into the size (resolution) used in the FAX. In the embodiment, the converted size is main scanning 200 dpi×sub scanning 100 dpi.

A gradation processing part 44 receives the monochrome 8-bit image data and then performs a gradation number converting process based on the capability of a gradation process used in the FAX. In the embodiment, binary gradation based on the error diffusion method as one of pseudo half-tone processes is used.

(Data Recording→Scanner Distribution Operation)

To start scanner distribution, a user sets some items including a desired mode and operates the operations display device 10 on the image data recorded in the HDD5 upon the previous copy operation.

The operations display device 10 converts the information input by the user into control command data used in the apparatus and issues the control command data. The issued control command data are sent to the CPU 6 through the PCI-Express bus.

The CPU 6 executes a program of a scanner distribution process, according to the control command data to start the scan distribution, and sequentially proceeds with settings and operations necessary for the scan distribution. The operation process is described below. FIG. 8C shows a sequence chart of the operation process.

The bus controlling device 3 outputs the RGB image data recorded in the HDD 5 to the memory 7 through the CPU 6 (step S421).

Then, as described above, the RGB image data in the memory 7 are output to the external I/F device 12 through the second image data processing device 4 (steps S422 through S424) and the scan distribution is performed.

The above operations in the second image data processing device 4 shown in FIG. 7 are sequentially described below.

A filter processing part 41 corrects the sharpness of the RGB image data to improve the reproducibility of the image data upon scanner distribution. More specifically, the sharpness is changed and/or a smoothing process is performed based on the desired mode information. For example, in a character mode, sharpness is increased to clarify and emphasize the characters, and in a picture mode, a smoothing process is performed to smooth the gradation of the picture.

A color conversion part 42 receives the 8-bit RGB data and then converts the data into a prescribed color space. In the embodiment, the converted color space is 8-bit sRGB color space generally used in scanner distributions.

A resolution change processing part 43 changes the size (resolution) of the data to fit to a designated size (resolution) used in the scanner distribution. In the embodiment, the converted size is main scanning 200 dpi×sub scanning 200 dpi.

A gradation processing part 44 performs a gradation number converting process based on the capability of a gradation process used in the prescribed scanner distribution. In the embodiment, 8-bit RGB 16 million colors are assumed to be designated, and no specific gradation process is performed.

(Operations and Effects of this Embodiment)

As described above, according to the embodiment of the present invention, it is possible to select a different output destination application other than the input source application without changing the image quality compared with a case of usual operations (that is, the output destination is already selected when data are recorded) when using data recorded and stored in the digital image processing apparatus 100. Therefore reusability of data is remarkably improved. Namely, when a user outputs the image data recorded and stored in an MFP, the user can output the data to a different application than the application used when the image data are recorded and stored in the MFP (for example, data are recorded from an external medium using a copy application and are then output for fax transmission).

Further, according to the configuration of the embodiment, the second image data processing device 4 performs common functions used for each output designation. Namely, it is possible to implement functions having the same purpose and commonly used for each output destination (for example, the sharpness adjusting function in a copy application and the sharpness adjusting function in a fax application can be implemented in the same part) into the same part of the configuration, thereby enabling functions to be implemented in the configuration effectively.

Still further, according to the configuration, the image data processes for the image data obtained through an external device can be divided and modularized into, for example, a matching module performing a matching process and an output module performing a process corresponding to each output destination. It is thus possible to meet various requirements from users by independently providing various types of both modules for the matching process and modules for the output process used in the second image data processing devices 4 only, without changing any other main parts. In addition, for example, as technology improves and a new requirement is added, it is possible to respond to the requirement by independently upgrading the second image data processing device 4 only. In this manner, it is possible to effectively meet a user's requests on the output devices.

Still further, from the development point of view, because of the configuration, it is possible to separately develop, debug, and change parameters of each module including a module performing the matching process for the image data obtained through the reading device 1 and a module performing the output process corresponding to each output destination, thereby improving the development efficiency. As a result, the development period can be shortened.

In addition, since the characteristics of the image data recorded by the second image data processing device 4 are matched to each other, it is possible to use the recorded data by any class of MFPs, from large-sized to small-sized. Namely, over every class of MFPs, it is possible to output the image data to a different application than the application used when recording and storing the image data in an MFP.

<Operations of Reusing Image Data: No. 4>

Next, the operations in cases where image data recorded in the external medium 17 are recorded and stored in the digital image processing apparatus 100 and then the image data are reused are described below.

(Scanner Distribution Operation+Recording and Storing Operation in the HDD)

Since the operations corresponding to the scanner distribution operation and the operations up to the recording and storing data in the HDD5 are the same as in the "No. 3", the descriptions of the operations are omitted.

Next, operations of reusing the image data recorded and stored in the HDD5 are described.

(Scanner Distribution Re-Designation Operations: Setting Change)

A user operates the operations display device 10 to start scanner distribution of the image data recorded in the HDD 5. During the operations, the setting including a mode designated when the data are recorded in the HDD5 is changed to a different setting.

The operations display device 10 converts the information input by the user into control command data used in the apparatus and issues the control command data. The issued control command data are sent to the CPU 6 through the PCI-Express bus.

The CPU 6 executes a program of a scanner distribution process, according to the control command data to start the scan distribution, and sequentially proceeds with settings and operations necessary for the scan distribution. The operation process is described below.

The bus controlling device 3 outputs the RGB image data recorded in the HDD 5 to the memory 7 through the CPU 6.

Then, as described above, the RGB image data in the memory 7 are output to the line I/F device 11 through the second image data processing device 4, and the scan distribution is performed.

The above operations in the second image data processing device 4 shown in FIG. 7 are sequentially described below.

The filter processing part 41 corrects the sharpness of the RGB image data to improve the reproducibility of the image data upon performing scanner distribution. More specifically, the sharpness is changed and/or smoothing process is performed based on the desired mode information. For example, in a character mode, sharpness is increased to clarify and emphasize the characters, and in a picture mode, a smoothing process is performed to smooth the gradation of the picture.

The color conversion part 42 receives the 8-bit RGB data and then converts the data into a prescribed color space. In the embodiment, since the re-designated mode setting is monochrome, the converted setting is monochrome 8-bit.

A resolution change processing part 43 changes the size (resolution) of the single color (monochrome) image data to fit the designated size (resolution) used in the scanner distribution. In the embodiment, the converted size is main scanning 400 dpi×sub scanning 400 dpi, according to the re-designated resolution.

A gradation processing part 44 performs a gradation number converting process based on the capability of a gradation process used in the prescribed scanner distribution. In the embodiment, binary gradation based on the error diffusion method as one of pseudo half-tone processes is used, according to the re-designation mode.

(Operations and Effects of this Embodiment)

As described above, according to the embodiment of the present invention, it is possible to select a different output destination application other than the input source application without changing the image quality compared with a case of usual operation (that is, the output destination is already selected when data are recorded) when data are recorded and stored in the digital image processing apparatus 100. Therefore reusability of data is remarkably improved. Namely, when a user outputs the image data recorded and stored in an MFP, the user can change the setting to output the data to a different application than the application used when the image data are recorded and stored in the MFP (for example, data are recorded by reducing from the size of two pieces of A4-sized draft data into one piece of A4-sized→two pieces of A4-sized draft are replaced by two pieces of A4-sized transfer papers).

Still further, according to the configuration, the image data processes for the image data obtained through an external device can be divided and modularized into, for example, a matching module performing a matching process and an output module performing a process corresponding to each output destination. It is thus possible to meet various requirements from users by independently providing various types of both modules for a matching process and modules for an output process used in the second image data processing devices 4 only, without changing any other main parts. In addition, for example, as technology improves and a new requirement is added, it is possible to respond to the requirement by independently upgrading the second image data processing device 4 only. In this manner, it is possible to effectively meet a user's requests on the output devices.

Still further, from the development point of view, because of the configuration, it is possible to separately develop, debug, and change parameters for each module including a module performing the matching process for the image data obtained through the reading device 1 and a module performing the output process corresponding to each output destination, thereby improving the development efficiency. As a result, the development period can be shortened.

In addition, since the characteristics of the image data recorded by the first image data processing device 2 are matched to each other, it is possible to use the recorded data by any class of MFPs, from large-sized to small-sized. Namely, over every class of MFPs, it is possible to output the image data to a different application than the application used when recording and storing the image data in an MFP.
<Operations of Reusing Image Data: No. 5>

Next, operations depending on a picture quality mode when the image data obtained by scanning a draft are recorded and stored in the digital image processing device 100, but then the recorded and stored data are reused are described.
(Setting a Picture Quality Mode and Operations of Recording and Storing in the HDD)

In the digital image processing devices 100 described in both "Operations of reusing image data: No. 1 and No. 2", it is possible to set a picture quality mode for each application operation.

For example, in a copy operation, the image quality mode includes a character mode for emphasizing the reproduction of characters, a picture mode for smoothing the gradation, and a map mode adapted to a map draft.

In scanner distribution and fax transmission operations, like in the copy operation, the image quality mode includes a character mode and a picture mode.

Regardless of any setting of the picture quality modes for each operation application, the characteristics of all RGB images are matched to the prescribed characteristics by way of the γ conversion part 21, the filter processing part 22, and the color conversion part 23 in the first image data processing device 2 and recorded and stored in the HDD 5.

The γ conversion part 21 matches the brightness of the RGB image data received from the reading device 1 to the brightness of predetermined characteristics. In the embodiment, as a method of they conversion, a known one-dimensional look-up table is used.

The filter processing part 22 matches the sharpness of the RGB image data to the sharpness of the predetermined characteristics. In the embodiment, the matching is performed so that the sharpness of each line corresponds to the predetermined MTF characteristic value when a reference chart shown as in FIG. 6 is scanned. As a method of the filter process, a method combining an edge-emphasizing filter using a known Laplacian process and a smoothing filter is used.

The color conversion part 23 matches the colors of RGB image data to the color of predetermined characteristics. In the embodiment, the matching is performed so that the color space of the RGB image data corresponds to the RGB color space defined by Adobe Systems, Inc. As a method of the color conversion, a known three-dimensional look-up table is used.

When the image data are reused, the filter processing part 41, the color converting part 42, and the gradation processing part 44 in the second image data processing device 4 convert the matched 8-bit RGB image data into the image data having the characteristics according to the prescribed image picture mode and output the converted data to the output destination designated by an operating application. In this embodiment, the data are output to the plotter device 9.

The filter processing part 41 corrects the sharpness of the RGB image data to improve the reproducibility of the image data upon output to the plotter device 9. More specifically, the sharpness is changed and/or a smoothing process is performed based on the desired picture quality mode information. For example, in the character mode, sharpness is increased to clarify and emphasize the characters, and in the picture mode, a smoothing process is performed to smooth the gradation of the picture.

The color conversion part 42 receives the 8-bit RGB data and then converts the data into 8-bit CMYK data which is a color space used in a plotter device. During the process, the chroma level of the data is adjusted according to the picture quality mode information requested by the user.

A gradation processing part 44 receives 8-bit CMYK image data and then performs a gradation number converting process based on the capability of gradation process of the plotter device 9. The gradation process is performed according to the image quality information requested by the user. For example, in the character mode, the error diffusion method as one of the pseudo half-tone processes having an excellent performance in clarifying and emphasizing the characters is used, and in the picture mode, a dithering method as one of the pseudo half-tone processes to provide a smooth gradation of the picture is used.
(Operations and Effects of this Embodiment)

As described above, according to the embodiment of the present invention, it is possible to select a different output destination application other than the input source application without changing the image quality compared with a case of usual operations (that is, the output destination is already selected when data are recorded) when data are recorded and stored in the digital image processing apparatus 100. Therefore reusability of data is remarkably improved. Namely, when a user changes the application used when recording and storing data and other settings and outputs (reuses) the image data recorded and stored in a memory device, the user can change the application and the settings based on the image quality mode, thereby remarkably improving the reusability of the recorded data with respect to the image quality mode. For example, the image data recorded in the picture mode by the copy application can be output in the character mode when reused. Further, the image data assumed to be output by fax transmission (monochrome) when being recorded can be output in full color to an image writing device.
<Operations of Reusing Image Data: No. 6>

Next, operations depending on a picture quality mode are described when the image data obtained by scanning a draft are recorded and stored in the digital image processing device 100, but then the recorded and stored data are reused.
(Setting a Picture Quality Mode and Operations of Recording and Storing in the HDD)

In the digital image processing devices 100 described in both "Operations of reusing image data: No. 3 and No. 4", it is possible to set the picture quality mode for each application operation.

For example, in a copy operation, the image quality mode includes a character mode for emphasizing the reproduction of characters, a picture mode for smoothing the gradation, and a map mode adapted to a map draft.

In scanner distribution and fax transmission operations, like in the copy operation, the image quality mode includes a character mode and a picture mode.

Regardless of any setting of the picture quality modes for each operation application, the characteristics of all RGB images are matched to the prescribed characteristics by way of the filter processing part 41 and the color conversion part 42 in the second image data processing device 4 and recorded and stored in the HDD 5.

The filter processing part 41 matches the sharpness of the RGB image data to the sharpness of the predetermined characteristics. In the embodiment, the matching is performed so that the sharpness of each line corresponds to the predetermined MTF characteristic value when a reference chart shown as in FIG. 6 is scanned. As a method of the filter process, a method combining an edge-emphasizing filter using a known Laplacian process and a smoothing filter is used.

The color conversion part 42 matches the colors of RGB image data to the color of the predetermined characteristic. In the embodiment, the matching is performed so that the color space of the RGB image data corresponds to the RGB color space defined by Adobe Systems, Inc. As a method of the color conversion, a known three-dimensional look-up table is used.

When the image data are reused, the filter processing part 41, the color converting part 42, and the gradation processing part 44 in the second image data processing device 4 convert the matched 8-bit RGB image data into the image data having the characteristics according to the prescribed image picture mode and output the converted data to the output destination designated by an operating application. In this embodiment, the data are output to the plotter device 9.

The filter processing part 41 corrects the sharpness of the RGB image data to improve the reproducibility of the image data upon output to the plotter device 9. More specifically, the sharpness is changed and/or a smoothing process is performed based on the desired mode information. For example, in the character mode, sharpness is increased to clarify and emphasize the characters, and in the picture mode, a smoothing process is performed to smooth the gradation of the picture.

The color conversion part 42 receives the 8-bit RGB data and then converts the data into 8-bit CMYK data which is a color space used in a plotter device. During the process, the chroma level of the data is adjusted according to the picture quality mode information requested by the user.

A gradation processing part 44 receives 8-bit CMYK image data and then performs a gradation number converting process based on the capability of gradation process of the plotter device 9. The gradation process is performed according to the image quality information requested by the user. For example, in the character mode, the error diffusion method as one of the pseudo half-tone processes having an excellent performance in clarifying and emphasizing the characters is used, and in the picture mode, the dithering method as one of the pseudo half-tone processes to express a smooth gradation of the picture is used.

(Operations and Effects of this Embodiment)

As described above, according to the embodiment of the present invention, it is possible to select a different output destination application other than the input source application without changing the image quality compared with a case of usual operations (that is, the output destination is already selected when data are recorded) when data are recorded and stored in the digital image processing apparatus 100. Therefore reusability of data is remarkably improved. Namely, when a user changes the application used when recording and storing data and other settings and outputs (reuses) the image data recorded and stored in a memory device, the user can change the application and the settings based on the image quality mode, thereby remarkably improving the reusability of the recorded data with respect to the image quality mode. For example, the image data recorded in the picture mode by the copy application can be output in the character mode when reused. Further, the image data assumed to be output by fax transmission (monochrome) when being recorded can be output in full color to an image writing device.

<Operations when Image Data are not Reused: No. 1>

Next, in the embodiment, operations are described with respect to a picture quality mode when the image data obtained by scanning a draft are recorded and stored in the digital image processing device 100, but then the recorded and stored data are not reused.

(Mode Setting of Image Quality Mode and Operations)

Image quality mode can be selected for each application operation in the digital image processing apparatus 100.

For example, in a copy operation, the image quality mode includes a character mode for emphasizing the reproduction of characters, a picture mode for smoothing the gradation, and a map mode adapted to a map draft.

In scanner distribution and fax transmission operations, like in the copy operation, the image quality mode includes a character mode and a picture mode.

The filter processing part 22 and the color conversion part 23 in the first image data processing device 2 shown in FIG. 5 match the characteristics of the RGB image data to the prescribed characteristics, based on the corresponding picture quality mode selected by the picture quality setting of an operating application.

The filter processing part 22 corrects the sharpness of RGB image data to improve the reproducibility of the image data upon output to the output devices such as the plotter device 9 and the external I/F device 12. More specifically, the sharpness is changed and/or a smoothing process is performed based on the desired image quality mode information. For example, in the character mode, sharpness is increased to clarify and emphasize the characters, and in the picture mode, a smoothing process is performed to smooth the gradation of the picture. As a method of the filter process, a method combining an edge-emphasizing filter using a known Laplacian process and a smoothing filter is used.

The color conversion part 23 receives the 8-bit RGB data and then converts the data into 8-bit CMYK data which is a color space used in a plotter device, or converts the 8-bit RGB data into 8-bit RGB which is a color space for the external I/F device. During the process, the chroma level of the data is adjusted according to the picture quality mode information requested by the user. As a method of the color conversion, a known three-dimensional look-up table is used.

The image data processed by the first image data processing device 2 are transferred though the bus controlling device 3, the CPU 6, and the memory 7, and are further processed in the second data processing device 4. The processed data are then transmitted in a designated output direction. During the above operations, the filter processing part 41 and the color conversion part 42 in the second image data processing device 4 do not perform any operations.

(Operations and Effects of this Embodiment)

As described above, when image data are not recorded and stored in the digital image processing apparatus 100 and a picture quality mode, for example the character mode, is selected from among various image picture modes to increase the sharpness of the characters, it is the first image data processing device 2 that corrects the image data to improve the reproducibility of output data from each output device.

Since the first image data processing device 2 has already performed the process corresponding to the image quality mode, the second image data processing device 4 does not perform any processes but passes through the data. Because of this feature, the control of image processing in the second image data processing device 4 becomes easier and moreover the process by the second image data processing device 4 can be omitted. As a result, fast image data processing can be achieved without changing any image quality compared with a case where the data are recorded and stored in the HDD 5 and then are re-output (reused), thereby improving the productivity of the digital image processing apparatus 100. Namely, the first image data processing device 2 performs the image processing that would otherwise be performed by the second image data processing device 4 and the image processing performed by the second image data processing device 4 can be omitted. As a result, it is possible to shorten the time of and simplify the controlling for parameter settings for the image processing and the throughput of the process can be improved by skipping the processes. Therefore, when image data are not reused, the productivity, from the point of view of both control and process, can be improved. For example, in a case where the character mode for copy application is set to image data, obtained by reading a draft, while the image data are recorded, since the image data are converted into the image data suitable for character reproduction by the first image data processing device 2 by considering the characteristics of the output device, the workload of controlling and processing in the second image data processing device 4 is reduced and the productivity is improved.

<Operations when Image Data are not Reused: No. 2>

Next, operations are described with respect to a picture quality mode when the image data recorded in the external medium 17 are recorded and stored in the digital image processing device 100, and then the recorded and stored data are not reused.

(Mode Setting of Image Quality Mode and Operations)

An image quality mode can be selected for each application operation in the digital image processing apparatus 100.

For example, in a copy operation, the image quality mode includes a character mode for emphasizing the reproduction of characters, a picture mode for smoothing the gradation, and a map mode adapted to a map draft.

In scanner distribution and fax transmission operations, like in the copy operation, the image quality mode includes a character mode and a picture mode.

The filter processing part 41, the color conversion part 42, and the gradation processing part 44 in the second image data processing device 4 shown FIG. 7 match the characteristics of the RGB image data to the prescribed characteristics, based on the corresponding picture quality mode selected by the picture quality setting of an operating application.

The filter processing part 41 corrects the sharpness of the RGB image data to improve the reproducibility of the image data upon output to the output devices such as the plotter device 9 and the external I/F device 12. More specifically, the sharpness is changed and/or a smoothing process is performed based on the desired image quality mode information. For example, in the character mode, sharpness is increased to clarify and emphasize the characters, and in the picture mode, a smoothing process is performed to smooth the gradation of the picture. As a method of the filter process, a method combining an edge-emphasizing filter using a known Laplacian process and a smoothing filter is used.

The color conversion part 42 receives the 8-bit RGB data and then converts the data into 8-bit CMYK which is a color space for the plotter device 9. In the scanner distribution operation, the 8-bit RGB data are converted into 8nit RGB, which is a color space for the external I/F device 12, or gray scale data. During the process, the chroma level of the data is adjusted according to the picture quality mode information requested by the user. As a method of the color conversion, a known three-dimensional look-up table is used.

A gradation processing part 44 receives 8-bit CMYK image data and then performs a gradation number converting process based on the capability of the gradation process of the plotter device 9. The gradation process is performed according to the image quality information requested by the user. For example, in the character mode, the error diffusion method as one of the pseudo half-tone processes having an excellent performance in clarifying and emphasizing the characters is used, and in the picture mode, the dithering method as one of the pseudo half-tone processes to form a smooth gradation of the picture is used. In the scanner distribution or the fax transmission operation, only when the monochrome binary value mode is selected, the gradation process corresponding to the image quality mode is similarly performed.

The image data processed by the second image data processing device 4 are transmitted to a designated output destination though the bus controlling device 3, the CPU 6, and the memory 7.

(Operations and Effects of this Embodiment)

As described above, when image data are not recorded and stored in the digital image processing apparatus 100 and a picture quality mode, for example, the character mode is selected from among various image picture modes to increase the sharpness of the characters, only the second image data processing device 4 corrects the image data to improve the reproducibility of output data from each output device. Since only the second image data processing device 4 can perform processes corresponding to the image quality mode, it is possible to perform fast processing without changing any image quality compared with a case where the data are recorded and stored in the HDD5 and are then re-output (reused), thereby improving the productivity of this digital image processing. Namely, since the operations of matching→output device can be performed in a single step, the throughput of processing is expected to be increased. Therefore, when image data are not reused, the productivity due to the increased throughput can be improved. For example, in a case where the character mode for copy application is set to the image data, obtained from the external I/F device, while the image data are being recorded, since the image data are converted into the image data suitable for character reproduction by the second image data processing device 4 by considering the characteristics of the output device in a single step, the productivity is improved.

<Summary>

In an image processing apparatus according to an embodiment of the present invention, image data input through an image reading unit are processed so that the characteristics of the image data are matched to prescribed characteristics so as to be usable for both an image writing unit and an external device. The image data whose characteristics are matched are recorded in a recording unit. The recorded image data become reusable in both the image writing unit and the external device by processing the image data so that the image data have characteristics suitable for the image writing unit and an external I/F unit. Therefore, reusability of digital image data can be improved.

The present invention is not limited to the specifically disclosed embodiments, and variations and modifications may be made without departing from the scope and spirit of the present invention.

The present application is based on and claims the benefit of priority of Japanese patent application No. 2006-220144, filed on Aug. 11, 2006, the entire contents of which are hereby incorporated by reference.

What is claimed is:

1. An image processing apparatus comprising:
an image reading unit configured to read a draft and obtaining digitized image data of the draft;
an image writing unit configured to print image data on a transfer paper;
a recording unit configured to record image data and attached information of the image data;
an external I/F unit configured to transmit and receive image data and attached information of the image data to and from an external device;
a first image data processing unit processing the image data from the image reading unit;
a second image data processing unit configured to process the image data from the recording unit or the external I/F unit; and
a bus controlling unit configured to connect each of the units, wherein:
the first image data processing unit is configured to match image sharpness characteristics of the image data using a modulation transfer function, the image data being input from the image reading unit, to selected image sharpness characteristics, obtained from a reference chart read by the image reading unit, so that the matched image data are usable for both the image writing unit and the external device, and record the matched image data in the recording unit, and
the second image data processing unit is configured to make the image data recorded in the recording unit reusable for both the image writing unit and the external device by matching the image sharpness characteristics of the image data using a modulation transfer function to the image sharpness characteristics suitable for both an output of the image writing unit and the external I/F unit, and wherein
in a case that a request from the external device to obtain the matched data recorded in the recording unit is received by the image processing apparatus, the external device is permitted to retrieve the matched data in the recording unit through the external I/F unit.

2. The image processing apparatus according to claim 1, wherein the first image processing unit is configured to match the image sharpness characteristics of the image data, input from the image reading unit, to prescribed image sharpness characteristics so as to enable an output setting of the matched image data, recorded in the recording device, to be selectable so that the matched image data are made reusable for the image writing unit or the external device by changing the output setting of the matched image data when the matched image data are output to the image writing unit or the external device.

3. The image processing apparatus according to claim 1, wherein the second image data processing unit is configured to
match the image sharpness characteristics of the image data, input from the external I/F unit, to prescribed image sharpness characteristics so that the matched image data are usable for both the image writing unit and the external device,
record the matched image data in the recording unit, and
make the image data, recorded in the recording unit, reusable for both the image writing unit and the external device by matching the image sharpness characteristics of the matched image data to the image sharpness characteristics suitable for output to both the image writing unit and the external I/F unit.

4. The image processing apparatus according to claim 3, wherein the second image processing unit is configured to match the image sharpness characteristics of the image data, input from the external I/F unit, to prescribed image sharpness characteristics so as to enable an output setting of the matched image data, recorded in the recording unit, to be selectable so that the matched image data are made reusable for the image writing unit or the external device by changing the output setting of the matched image data when the matched image data are output to the image writing unit or the external device.

5. The image processing apparatus according to claim 1, wherein in a case that the image data read from the draft by a user are recorded in the recording unit and reused and even in a case that an image quality mode to be used when the image data are reused is designated when the image data are input from the draft, the first image data processing unit is configured to match an image quality of the image data input from the image reading unit to a prescribed image quality so that a setting of an image quality mode of the image data can be changed when the image data are re-output to the image writing unit and the external device.

6. The image processing apparatus according to claim 3, wherein in a case that the image data read from the external I/F unit by a user are recorded in the recording unit and reused and even in a case that an image quality mode to be used when the image data are reused is designated when the image data are input, the second image data processing unit is configured to match an image quality of the image data input from the external I/F unit to a prescribed image quality so that the setting of an image quality mode of the image data can he changed when the image data are re-output to the image writing unit and the external device.

7. The image processing apparatus according claim 1, wherein in a case that the image data read from the draft by a user are neither recorded in the recording unit nor reused, the first image data processing unit is configured to convert the image sharpness characteristics of the image data into the image sharpness characteristics according to a setting of the picture quality mode used when the image data are output.

8. The image processing apparatus according claim 3, wherein in a case that the image data input from the external I/F unit by a user are neither recorded in the recording unit nor reused, the second image data processing unit is configured to convert the image sharpness characteristics of the image data into the image sharpness characteristics according to a setting of the picture quality mode used when the image data are output.

9. An image processing method comprising:
an image reading step of reading a draft and obtaining digitized image data of the draft;
an image writing step of printing image data on a transfer paper;
a recording step of recording image data and attached information of the image data, in a recording unit of an image processing apparatus;
an external I/F step of transmitting and receiving image data and attached information of the image data to and from an external device;
a first image data processing step of processing the image data from the image reading step;
a second image data processing step of processing the image data from the recording step or the external I/F step; and a bus controlling step of exchanging data in each of the steps, wherein:

in the first image data processing step, image sharpness characteristics of the image data, from the image reading step, are matched to selected image sharpness characteristics, obtained from a reference chart read by an image reading unit of the image processing apparatus, using a modulation transfer function so that the matched image data are usable in the image writing step and the external I/F step and the matched image data are recorded in the recording step; and in the second image data processing step, the image data, recorded in the recording step, are made to be reusable in the image writing step and the external I/F step by matching the image sharpness characteristics of the image data using a modulation transfer function to the image sharpness characteristics suitable for the output of both the image writing step and the external I/F step, and wherein in a case that a request from the external device to obtain the matched data recorded in the recording unit is received by the image processing apparatus, the external device is permitted to retrieve the matched data in the recording unit through the external I/F unit.

10. The image processing method according to claim 9, wherein in the first image processing step, the image sharpness characteristics of the image data from the image reading step are matched to prescribed image sharpness characteristics so as to enable an output setting of the matched image data, from the recording step to he selectable so that the matched image data are made reusable for the image writing step or the external I/F step by changing the output setting of the matched image data when the matched image data are output from the image writing step or the external I/F step.

11. The image processing method according to claim 9, wherein in the second image data processing step, the image sharpness characteristics of the image data, from the external I/F step, are matched to prescribed image sharpness characteristics so that the matched image data are usable for both the image writing step and the external I/F step, the matched image data is recorded in the recording step, and the image data, recorded in the recording step, is made reusable for both the image writing step and the external I/F step by matching the image sharpness characteristics of the matched image data to the image sharpness characteristics suitable for output at both the image writing step and the external I/F step.

12. The image processing method according to claim 11, wherein in the second image processing step, the image sharpness characteristics of the image data, from the external I/F step, are matched to prescribed image sharpness characteristics so as to enable an output setting of the matched image data, recorded in the recording step, to be selectable so that the matched image data are made reusable for the image writing step or the external I/F step by changing the output setting of the matched image data when the matched image data are output at the image writing step or the external I/F step.

13. The image processing method according claim 9, wherein in a case that the image data read from the draft by a user are recorded in the recording step and reused and even in a case that an image quality mode to be used when the image data are reused is designated when the image data are input from the draft, the first image data processing step matches an image quality of the image data input from the image reading step to a prescribed image quality so that a setting of an image quality mode of the image data can be changed when the image data are re-output at the image writing step and the external I/F step.

14. The image processing method according to claim 11, wherein in a case that the image data read at the external I/F step by a user are recorded in the recording step and reused and even in a case that an image quality mode to be used when the image data are reused is designated when the image data are input, the second image data processing step matches an image quality of the image data input from the external I/F step to a prescribed image quality so that a setting of an image quality mode of the image data can be changed when the image data are re-output at the image writing step and the external step.

15. The image processing method according to claim 9, wherein in a case that the image data read from the draft by a user are neither recorded in the recording step nor reused, the first image data processing step converts the image sharpness characteristics of the image data into the image sharpness characteristics according to a setting of the picture quality mode used when the image data are output.

16. The image processing method according to claim 11, wherein in a case that the image data input from the external I/F step by a user are neither recorded in the recording step nor reused, the second image data processing step converts the image sharpness characteristics of the image data into the image sharpness characteristics according to the setting of the picture quality mode used when the image data are output.

\* \* \* \* \*